United States Patent [19]
Collins

[11] 3,834,465
[45] Sept. 10, 1974

[54] EARTH WORKING IMPLEMENT LIFT ASSEMBLY

[75] Inventor: Johnnie C. Collins, Dallas, Tex.

[73] Assignee: Servis Equipment Company, Dallas, Tex.

[22] Filed: Feb. 5, 1973

[21] Appl. No.: 329,757

[52] U.S. Cl. ............................. 172/197, 172/448
[51] Int. Cl. ................... A01b 49/02, A01b 59/043
[58] Field of Search ........... 172/448, 197, 482, 491, 172/784, 785; 37/117.5

[56] References Cited
UNITED STATES PATENTS

| | | | |
|---|---|---|---|
| 2,839,851 | 6/1958 | Geiszler | 172/197 |
| 3,069,791 | 12/1962 | French | 172/448 X |
| 3,213,554 | 10/1965 | Dalton | 172/448 X |
| 3,274,712 | 9/1966 | Jones | 172/448 X |
| 3,274,713 | 9/1966 | Jones | 172/448 X |
| 3,470,964 | 10/1969 | West et al. | 172/197 |

Primary Examiner—Stephen C. Pellegrino
Attorney, Agent, or Firm—Clegg, Cantrell & Crisman

[57] ABSTRACT

A lift assembly for an earth working implement adapted to be attached to a tractor rear lift mechanism and having a scraper blade and scarifier means movable between extended earth engaging and retracted inoperative positions, the assembly including extensible hydraulic means and crank means pivotally connecting the scarifier means to the hydraulic means for raising and lowering said scarifier means as well as latch means for maintaining the latter in extended position, said hydraulic means being pivotally mounted to permit its limited movement and prevent damaging thereof when extended upon accidental disengagement of the latch means and upward retraction of said scarifier means.

4 Claims, 5 Drawing Figures

EARTH WORKING IMPLEMENT LIFT ASSEMBLY

SUMMARY OF THE INVENTION

This invention relates to a novel lift assembly for an earth working implement adapted to be attached to the top and lower links of a tractor rear lift mechanism and having a frame carrying a scraper blade with a scarifier assembly pivotally mounted on the frame for swinging movement relative thereto between retracted inoperative and extending earth engaging positions. A hydraulic cylinder is pivotally attached to the frame and has its piston pivotally connected by a crank to the scarifier assembly for lowering and raising the latter between its retracted and extended positions, the crank being pivotally fastened to said frame and having latch means at its rear position for holding said scarifier in its extended position. Due to its pivotal attachment to the frame, the hydraulic cylinder may undergo limited relative movement in order to prevent damaging thereof in the event of accidental disengagement of the latch means and upward swinging of the scarifier assembly when the piston is extended.

A construction designed to carry out the invention will be described hereinafter together with other features thereof.

BRIEF DESCRIPTION OF THE DRAWINGS

FIG. 3 is an exploded perspective view of the lift assembly and adjacent portions of said implement, FIG. 5 is an enlarged front elevational view of said lift assembly and adjacent portions of said implement.

DESCRIPTION OF THE PREFERRED EMBODIMENT

Figure 1:
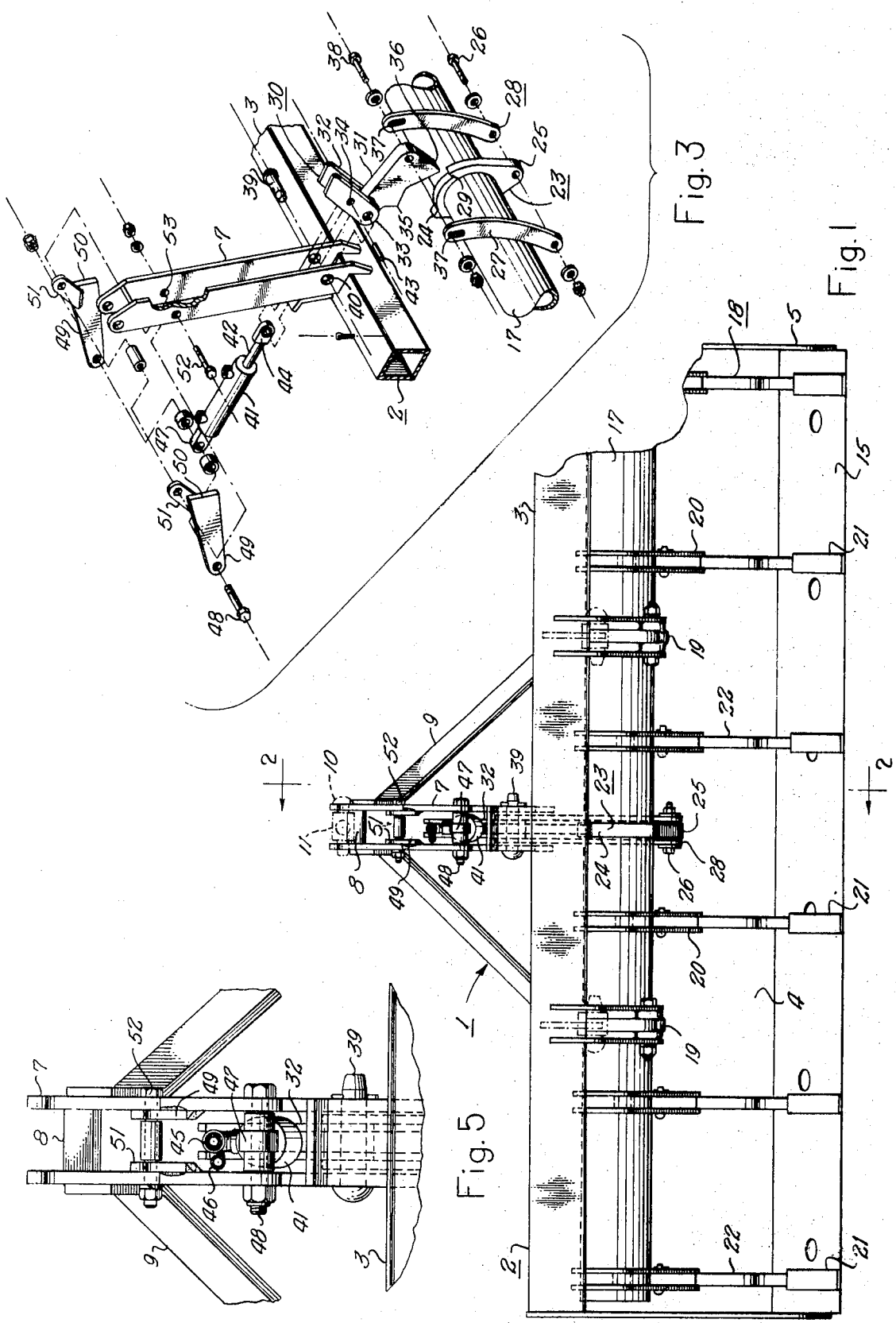
FIG. 1 is a front elevational view of an earth working implement equipped with a lift assembly constructed in accordance with the invention, the scraper blade and scarifier of the implement being in extended or lowered ground engaging position.

In the drawings, the numeral 1 designates an earth working implement having a generally rectangular frame 2 which includes a substantially horizontal box beam or tubular member 3, square or rectangular in cross-section, and a transverse scraper blade 4 at its rear end portion connected to the beam by a pair of upright end plates or side members 5 and, at the upper margin of the blade, by a pair of intermediate reinforcing bars or members 6. A pair of forwardly inclined, closely spaced flat members or bars 7 upstand from the medial portion of the beam 3 and have their upper end portions reinforced by a cross plate 8 and connected by inclined, rearwardly divergent brace members or bars 9 to the rear end portions of the reinforcing bars 6. Above the cross plate 8, the upper ends of the upstanding bars 7 have a horizontal transverse pin 10 journaled therein for attachment to the rear end of the top link 11 of a conventional tractor rear lift mechanism (not shown). This mechanism includes a pair of draft or lower links 12 which are arranged to have their rear ends connected by pivot pins 13, similar to the pin 10, to the front ends of two pairs of brackets 14 projecting both forwardly and rearwardly from the beam and secured thereto as well as to the reinforcing bars.

Manifestly, this arrangement permits the implement 1 to be raised and lowered out of and into earth engaging position in the usual manner. Preferably, the lower margin of the scraper blade 4 is provided with a coextensive double edge, reversible cutting element 15. As shown at 16 in FIGS. 2 and 4, a coextensive, double edge, reversible backfill blade may be pivotally fastened to the rear surface of the lower margin of the scraper blade.

A horizontal, cylindrical member or shaft 17, preferably hollow or tubular, extends transversely between the end plates 5 of frame 2 rearwardly and slightly below the beam 3 for pivotally supporting a scarifier assembly 18 and is journaled in split bearings 19 (FIG. 1) which are carried by the rear end portions of the pairs of brackets 14. The shaft 17 has a plurality of preferably equally spaced hangers or socket elements 20 depending rearwardly therefrom for suspending scarifier teeth 21 below said shaft. As best shown in FIG. 1, each scarifier tooth includes an upright flat arm or shank 22 having its upper end portion removably confined in one of the hangers 20.

In order to prevent forward or clockwise movement (FIGS. 2 and 4) of the scarifier assembly 18 past the extended or ground engaging position thereof in which the depending scarifier arms 22 are substantially upright, a collar 23 is secured to the medial portion of the shaft 17 and has an enlargement or lug 24 projecting forwardly therefrom for engaging the underside of the beam 3. Opposite the lug 24, the collar 23 has a rearward, downward projection or ear 25 pivotally attached at 26 to the lower extremities of a pair of upstanding, arcuate or curved lift elements or links 27 which are arranged in side by side relationship and which form a part of a lift assembly 28 (FIG. 3). For coacting with another part of the latter assembly to prevent rearward and upward or counterclockwise pivoting of the scarifier assembly from its extended or ground engaging position (FIGS. 1 and 2), another lug or projection 29 is formed on the upper rear portion of the collar between the lug 23 and ear 25.

The lift assembly 28 includes a crank 30 having a rearwardly extending portion or plate 31 and a pair of upstanding parallel portions or arms 32 rigidly secured at their lower ends to the front ends of the plate 31 on opposite sides thereof and inclined rearwardly at an acute angle thereof. As shown in FIG. 3, alined openings 33 extend transversely through the connected ends of the crank plate 31 and arms 32 and similar openings 34 of smaller diameter are formed in said crank arms thereabove. The lower margin of the plate of the crank 30 is of angular configuration and consists of a depending front portion or shoulder 35 for engaging the upper portion of the rear surface of the beam 3 (FIG. 2) and an enlarged, depending rear portion or bill 36 for substantially simultaneous engagement with the lug 29 of the collar 23. The latter have flat coacting surfaces which prevent rearward-upward or counterclockwise movement of the scarifier assembly when the surfaces are in contact and which are so oriented as to facilitate engagement and disengagement thereof.

As best shown in FIG. 3, aligned slots 37 extend longitudinally of the upper end portions of the arcuate links 28 for loose connection by a transverse pivot pin 38 to the rear end of the crank plate 31, whereby the crank 30 may be pivoted forwardly upwardly or counterclockwise an amount sufficient to disengage the coacting surfaces of the lug 29 and bill 36 before lifting movement of the scarifier assembly 18. The crank 30 is pivotally mounted with its front end portion overlying the beam 3 by a transverse pin 39 which extends through the openings 33 of said crank and through alined openings 40 in the lower portions of the pair of upstanding medial bars 7 of the frame 2.

For actuating the crank to raise and lower the scarifier assembly, a hydraulic cylinder 41 has the rear end of its piston rod 42 confined between and pivotally connected to the intermediate portions of the crank arms 32 by a transverse pin 43 which extends through the openings 34 of said arms. As shown at 44, the rear end of the piston rod is enlarged, flattened and has an opening for receiving the pin 43. A suitable source (not shown) of pressure fluid for operating the hydraulic cylinder 41 is connected by suitable lines 45 and 46 to opposite end portions of said cylinder which extends forwardly of the frame arms 7.

For supporting the cylinder in such manner as to permit limited movement thereof, an ear or lug 47 projects forwardly from the front end of said cylinder and is pivotally connected by a transverse pin 48 to the front ends of a pair of parallel, rearwardly and upwardly inclined arms or links 49. Normally, the rear end surfaces 50 of the links 49 bear against the front surfaces of the frame arms, being complementary to the inclination thereof, so as to maintain the cylinder 41 and its rod 42 in a substantially horizontal plane. Also, a pair of lugs or ears 51 are secured to the rear portions of the links and extend upwardly and rearwardly therefrom, being pivotally attached by a transverse pin 52 to the arms 7 in which openings 53 for the pin are provided (FIG. 3).

Figure 2:
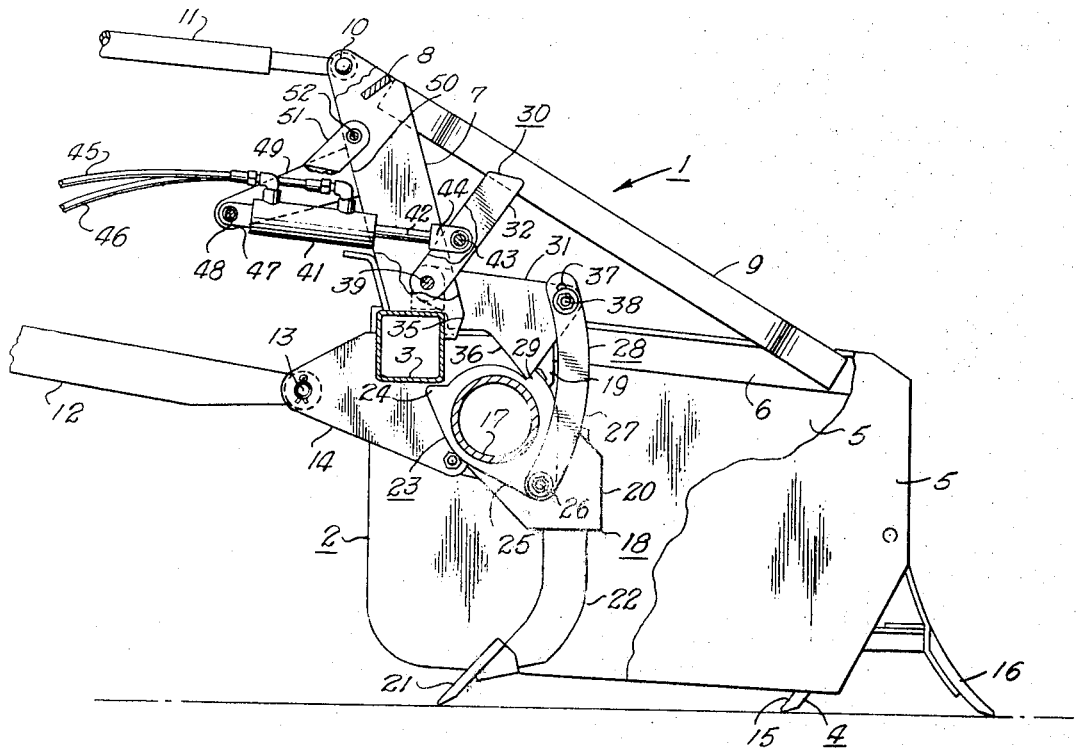
FIG. 2 is a transverse vertical sectional view taken on the line 2—2 of FIG. 1.
Figure 4:
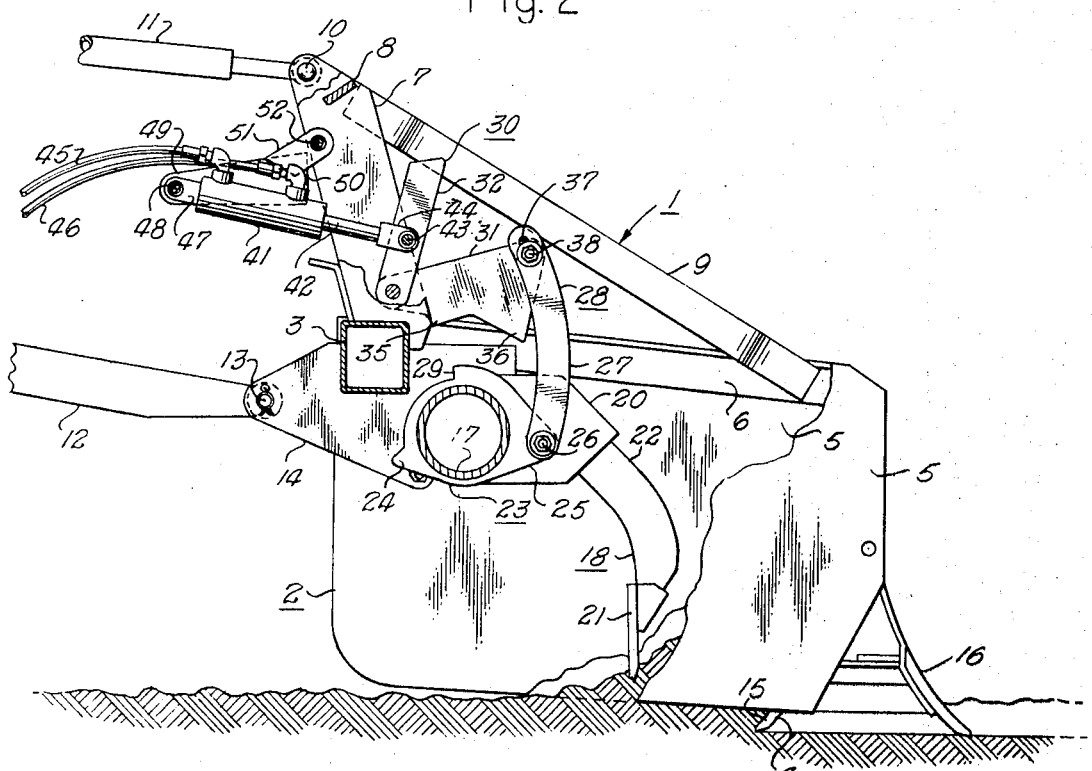
FIG. 4 is a view, similar to FIG. 2, illustrating the pivotal movement of the hydraulic cylinder upon accidental disengagement of the latch and upward pivoting of the scarifier.

Due to this arrangement, damaging of the hydraulic cylinder is prevented when its piston rod is extended in the event that the resistance to forward movement is sufficient to pivot the scarifier assembly 18 rearwardly or counterclockwise so as to disengage the bill 36 of the crank plate 31 from the lug 29 of the collar 23. As shown in FIG. 4, the pivotal mounting of the cylinder 41 permits it as well as its piston to pivot clockwise upon this pivoting of the scarifier assembly. Also, it is noted that the rear end surfaces 50 of the links 49 function as abutment means for stabilizing the hydraulic cylinder and preventing counterclockwise pivoting of said cylinder or movement thereof toward the crank 30 when the bill is engaged with the lug (FIG. 2).

The foregoing description of the invention is explanatory thereof and various changes in the size, shape and materials, as well as in the details of the illustrated construction may be made, without departing from the spirit of the invention.

What is claimed is:

1. In an earth working implement having a frame adapted to be attached to a tractor rear left mechanism and carrying a scraper blade for pivotal movement into and out of ground engaging position, a scarifier assembly pivotally mounted on the frame, crank means pivotally fastened to said frame and assembly for lowering and raising the scarifier assembly between earth engaging and disengaging positions, and latch means for maintaining said scarifier assembly in its earth engaging position against reactive earth applied pivoting forces,
a lift assembly including
hydraulic means pivotally connected to the crank means for imparting swinging movement thereto and to said scarifier assembly,
and means pivotally attaching the hydraulic means to said frame so as to permit limited pivotal movement of said hydraulic means relative to said crank means and frame and prevent damaging of said hydraulic means in the event of accidental disengagement of the latch means and upward movement of said scarifier assembly relative to said means,
the pivotal attaching means being pivotally connected to said frame above and in space relation to its pivotal fastening to said hydraulic means so as to undergo swinging movement upon pivoting of said hydraulic means.

2. A lift assembly as defined in claim 1 wherein
the pivotal attaching means comprises abutment means for bearing against the frame to stabilize the hydraulic means and prevent pivoting thereof toward the crank means when the latch means is engaged.

3. In an earth working implement having a frame adapted to be attached to a tractor rear lift mechanism and carrying a scraper blade for pivotal movement into and out of ground engaging position, a scarifier assembly pivotally mounted on the frame, crank means pivotally fastened to said frame and assembly for lowering and raising the scarifier assembly between earth engaging and disengaging positions, and latch means for maintaining said scarifier assembly in its earth engaging position against relative earth applied pivoting forces,
a lift assembly including
hydraulic means pivotally connected to the crank means for imparting swinging movement thereto and to said scarifier assembly,
and means pivotally attaching the hydraulic means to said frame so as to permit limited pivotal movement of said hydraulic means relative to said crank means and frame and prevent damaging of said hydraulic means in the event of accidental disengagement of the latch means and upward movement of said scarifier assembly relative to said means,
said hydraulic means comprising a cylinder and piston with the cylinder being connected to said frame by the pivotal attaching means and the piston being connected to said crank means,
said pivotal attaching means comprising a link having one end pivotally connected to said frame above said hydraulic cylinder and its opposite end pivotally fastened to said cylinder so as to undergo swinging movement upon pivoting of said cylinder.

4. A lift assembly as defined in claim 3 wherein
the link has an abutment surface for bearing against the frame to stabilize the hydraulic cylinder and prevent pivoting thereof toward the crank means when the latch means is engaged.

* * * * *